United States Patent
Kalina (10) Patent No.: US 7,600,394 B2
(45) Date of Patent: Oct. 13, 2009

(54) SYSTEM AND APPARATUS FOR COMPLETE CONDENSATION OF MULTI-COMPONENT WORKING FLUIDS

(75) Inventor: Alexander I. Kalina, Hillsborough, CA (US)

(73) Assignee: Kalex, LLC, Belmont, CA (US)

( * ) Notice: Subject to any disclaimer, the term of this patent is extended or adjusted under 35 U.S.C. 154(b) by 426 days.

(21) Appl. No.: 11/399,287

(22) Filed: Apr. 5, 2006

(65) Prior Publication Data

US 2007/0234750 A1 Oct. 11, 2007

(51) Int. Cl.
*F25J 1/00* (2006.01)
*F25B 39/04* (2006.01)

(52) U.S. Cl. .................. 62/606; 62/506; 165/DIG. 185; 165/DIG. 206

(58) Field of Classification Search .................. 62/506, 62/606; 165/DIG. 185, DIG. 206
See application file for complete search history.

(56) References Cited

U.S. PATENT DOCUMENTS

| | | | | |
|---|---|---|---|---|
| 2,852,090 | A * | 9/1958 | Kelley | 95/194 |
| 3,423,286 | A * | 1/1969 | Weems et al. | 376/284 |
| 3,755,075 | A * | 8/1973 | Henrie | 376/300 |
| 4,608,119 | A * | 8/1986 | Rowland | 159/3 |
| 5,843,214 | A * | 12/1998 | Janes | 96/242 |
| 6,019,819 | A * | 2/2000 | Williams | 95/206 |
| 6,735,948 | B1 | 5/2004 | Kalina | 60/649 |
| 6,769,256 | B1 | 8/2004 | Kalina | 60/653 |
| 6,820,421 | B2 | 11/2004 | Kalina | 60/649 |
| 6,829,895 | B2 | 12/2004 | Kalina | 60/649 |
| 6,910,334 | B2 | 6/2005 | Kalina | 60/651 |
| 6,923,000 | B2 | 8/2005 | Kalina | 60/649 |
| 6,941,757 | B2 | 9/2005 | Kalina | 60/649 |
| 6,968,690 | B2 | 11/2005 | Kalina | 60/649 |
| 7,021,060 | B1 | 4/2006 | Kalina | 60/649 |
| 7,043,919 | B1 | 5/2006 | Kalina | 60/651 |
| 7,055,326 | B1 | 6/2006 | Kalina | 60/649 |
| 7,065,967 | B2 | 6/2006 | Kalina | 60/649 |
| 7,065,969 | B2 | 6/2006 | Kalina | 60/670 |
| 2003/0072981 | A1 * | 4/2003 | Imaseki et al. | 429/13 |
| 2005/0061654 | A1 | 3/2005 | Kalina | 203/21 |
| 2006/0096288 | A1 | 5/2006 | Kalina | 60/649 |
| 2006/0096290 | A1 | 5/2006 | Kalina | 60/649 |
| 2006/0165394 | A1 | 7/2006 | Kalina | 392/386 |
| 2006/0199120 | A1 | 9/2006 | Kalina | 431/9 |

OTHER PUBLICATIONS

U.S. Appl. No. 11/514,290, filed Aug. 31, 2006, Kalina.
U.S. Appl. No. 11/399,306, filed Apr. 5, 2006, Kalina.
U.S. Appl. No. 11/238,173, filed Sep. 28, 2005, Kalina.
U.S. Appl. No. 11/235,654, filed Sep. 22, 2005, Kalina.
U.S. Appl. No. 11/227,991, filed Sep. 15, 2005, Kalina.

* cited by examiner

*Primary Examiner*—William C Doerrler
(74) *Attorney, Agent, or Firm*—Robert W Strozier (57) ABSTRACT

A condensation system is disclosed where a multi-component fluid is condensed to form a condensate, a portion of which is sub-cooled and mixed with non-condensable vapor in the system to reduce the accumulation of non-condensable vapor and to improve the stability and efficiency of the condensation system.

28 Claims, 7 Drawing Sheets

SYSTEM AND APPARATUS FOR COMPLETE CONDENSATION OF MULTI-COMPONENT WORKING FLUIDS

BACKGROUND OF THE INVENTION

1. Field of the Invention

The present invention relates to a system and an apparatus for complete condensation of multe-component working fluids.

More particularly, the present invention relates to a system and an apparatus for complete condensation of multi-component working fluids, where the apparatus includes a condenser, a sub-cooler and a dividing valve. The condenser is adapted to condense a multi-component fluid in counter flow with a coolant stream to produce a condensate and a non-condensable vapor. The dividing valve is adapted to split a condensate stream exiting the condenser into a fully condensed multi-component working fluid stream which is returned to a power plant and an absorbent stream. The sub-cooler sub-cools the absorbent stream which is pumped through a sprayer into a vapor section of the condenser, where sub-cooled absorbent stream is sufficient to absorb an amount of non-condensable vapor reducing its accumulation in the apparatus and improving condensation stability and efficiency.

2. Description of the Related Art

In the process of condensing a multi-component working fluid, condensate (liquid) accumulates on a cooling surface at a temperature that is lower than an average or a "mixed mean" temperature of a condensing stream of a multi-component working fluid. At the same time, a temperature of a vapor is higher than the average or mixed mean temperature. As a result, a composition of the liquid or condensate and a composition of the vapor are not in equilibrium. This departure from equilibrium is the driving force in the process of condensation.

When the process of condensation comes to an end, the composition of the liquid becomes equal to a composition of the whole stream. Almost all of the stream converts into the liquid, but a very small quantity of vapor remains uncondensed and this vapor has a composition which is almost in equilibrium with the liquid. This vapor is referred to as uncondensable vapor.

Over time, this uncondensable vapor accumulates in the condenser and inhibits heat transfer. As a result, the pressure of condensation increases and this increase has a negative impact on performance of the condenser, and on a power system that includes the condensation process as a whole.

Thus, there is a need in the art for a system and an apparatus designed to prevent the accumulation of uncondensable vapor and to provide efficient and stable operation of condensation systems designed to condense multi-component working fluids.

SUMMARY OF THE INVENTION

The present invention provides a method for preventing accumulation of non-condensable vapor in a condensation apparatus adapted to produce a fully condensed multi-component working fluid for return to a power system or other facility that uses fully condensed multi-component working fluids. The method includes the step of feeding an incoming vapor multi-component stream into a first heat exchange unit, which condenses the stream in counter-flow with an external coolant to form a condensate and an non-condensable vapor. A major portion of the condensate is divided from a condensate stream withdrawn from the first heat exchange unit to form an outgoing fully condensed multi-component fluid and a minor portion of the condensate stream forms an absorbent stream. The absorbent stream is forwarded to a second heat exchange unit, where it is sub-cooled in counter-flow with an external coolant to form a sub-cooled absorbent stream. The sub-cooled absorbent stream is then injected (pumped) into the first heat exchange unit through a sprayer above a liquid level in the first heat exchange unit. The sub-cooled absorbent stream is sufficient to absorb an amount of non-condensable vapor reducing its accumulation in the apparatus and improving condensation stability and efficiency. The method can optionally include feeding the entire condensate stream and a non-condensable vapor stream to a receiver. The condensate in the receiver is then withdrawn and separated into the outgoing multi-component working fluid stream and the absorbent stream. The absorbent stream is then sub-cooled and pumped into a vapor section of the receiver through a sprayer, where the sub-cooled absorbent stream is sufficient to absorb an amount of non-condensable vapor reducing its accumulation in the apparatus and improving condensation stability and efficiency.

The present invention also provides an apparatus designed to prevent the accumulation of non-condensable or uncondensable vapor and to provide efficient and stable operation of a condenser in a condensation system adapted to produce fully condensed multi-component working fluid streams. The apparatus includes a first heat exchange unit, a dividing valve and a second heat exchange unit. The first heat exchange unit is adapted to condense a vapor incoming multi-component working fluid stream. The condensate is forwarded to the dividing valve, which divides the condensate into a outgoing fully condensed working fluid stream comprising a major portion of the condensate and an absorbent stream comprising a minor portion of the condensate. The absorbent stream is fed to the second heat exchange unit, where it is sub-cooled to form a sub-cooled absorbent stream. The sub-cooled absorbent stream is then pumped into the first heat exchange unit through a sprayer above a liquid level, where the sub-cooled absorbent stream is sufficient to absorb an amount of non-condensable vapor reducing its accumulation in the apparatus and improving condensation stability and efficiency. The apparatus can also includes a receiver adapted to receive the entire condensate from the first heat exchange unit and the non-condensable vapor. The receiver include a vapor section and a condensate or liquid section. The condensate is then withdrawn from the receiver and divided in a dividing value into the out-going fully condensed multi-component working fluid stream and the absorbent stream. The absorbent stream is then sub-cooled in the second heat exchange unit and pump into the vapor section of the receiver through a sprayer, where the sub-cooled absorbent stream is sufficient to absorb an amount of non-condensable vapor reducing its accumulation in the apparatus and improving condensation stability and efficiency.

BRIEF DESCRIPTION OF THE DRAWINGS

The invention can be better understood with reference to the following detailed description together with the appended illustrative drawings in which like elements are numbered the same:

FIG. 1 depicts an embodiment of a condensation apparatus of this invention for completely condensing multi-component working fluids;

FIG. 2 another embodiment of a condensation apparatus of this invention for completely condensing multi-component working fluids;

FIG. 3 another embodiment of a condensation apparatus of this invention for completely condensing multi-component working fluids.

DETAILED DESCRIPTION OF THE INVENTION

The inventor has found that a new condensation system and apparatus for multi-component working fluids can be constructed for complete or final condensation of the multi-component working fluids. The apparatus and method is designed to condense a multi-component fluid stream into a condensate and a non-condensable vapor. The condensate is then withdrawn and a major portion is sent out of the apparatus, while a minor portion is sub-cooled and sprayed into the non-condensable vapor, where the sub-cooled absorbent stream is sufficient to absorb an amount of non-condensable vapor reducing its accumulation in the apparatus and improving condensation stability and efficiency.

The present invention broadly relates to a condensation apparatus for condensing a multi-component fluid including two heat exchange units. The first heat exchange unit condenses substantially all of the in-coming stream to form a condensate stream, which is divided into an out-going fully condensed multi-component fluid stream comprising a major portion of the condensate stream and an absorbent stream comprising a minor portion of the condensate stream. The second heat exchange unit sub-cools the absorbent stream to form a sub-cooled absorbent stream. The sub-cooled absorbent stream is then pumped into the first heat exchange unit through a sprayer above a liquid level therein, where the sub-cooled absorbent stream is sufficient to absorb an amount of non-condensable vapor reducing its accumulation in the apparatus and improving condensation stability and efficiency. The apparatus can also include a receiver adapted to receive the entire condensate stream and a non-condensable vapor stream from the first heat exchange unit. The receiver includes a vapor section and a liquid section. A condensate stream is then withdrawn from the liquid section of the receiver and divided in a dividing value into the out-going fully condensed multi-component working fluid stream and the absorbent stream. Again, the absorbent stream is sub-cooled in the second heat exchange unit and pumped into the vapor section of the receiver through a sprayer above a liquid level therein, where the sub-cooled absorbent stream is sufficient to absorb an amount of non-condensable vapor reducing its accumulation in the apparatus and improving condensation stability and efficiency.

The present invention broadly relates to a condensation method including the step of feeding an in-coming multi-component fluid stream into a first heat exchange unit of a condensation apparatus, where the stream is condensed forming a condensate and a non-condensable vapor. The condensate is then withdrawn from the first heat exchange unit as a condensate stream and split into an out-going fully condensed multi-component fluid stream and an absorbent stream, where the out-going stream comprises a major portion of the condensate stream and the absorbent stream comprises a minor portion of the condensate stream. The absorbent stream is passed through a second heat exchange unit where it is sub-cooled. The sub-cooled absorbent stream is then pumped into the first heat exchanger through a sprayer above a liquid level in the first heat exchange unit, where the sub-cooled absorbent stream is sufficient to absorb an amount of non-condensable vapor reducing its accumulation in the apparatus and improving condensation stability and efficiency. The method can also include the step of passing the entire condensate stream and a stream of the non-condensable vapor into a receiver. The condensate is then withdrawn from a bottom of the receiver as a receiver condensate stream, where it is divided into the out-going stream and the absorbent stream. The absorbent stream is then sub-cooled in the second heat exchange unit and the sub-cooled absorbent stream is pumped into a vapor region of the receiver via a sprayer, where the sub-cooled absorbent stream is sufficient to absorb an amount of non-condensable vapor reducing its accumulation in the apparatus and improving condensation stability and efficiency.

The working fluids suitable for use in the condensation apparatuses of this inventions is a multi-component fluid that comprises a lower boiling point material—the low boiling component—and a higher boiling point material—the high boiling component. The working fluid, a multi-component mixture of at least two components with different normal boiling temperatures. In the certain embodiments of the system, the mixture consists of water and ammonia, but other working fluids, such as a mixture of hydrocarbons, freons or other substances can be used as well. In other embodiments, the working fluids include, without limitation, an ammonia-water mixture, a mixture of two or more hydrocarbons, a mixture of two or more freons, a mixture of hydrocarbons and freons, or the like. In other embodiments, the working fluid comprises a mixture of water and ammonia. However, the fluid can comprise mixtures of any number of compounds with favorable thermodynamic characteristics and solubilities.

The dividing valves used in this invention are well known in the art and are used to split streams into two or more substream, where the flow going into each stream being controlled by the exact construction of the dividing valve or by a control on the valve setting so that the flow rate is changeable to maintain the system.

FIRST EMBODIMENT

Referring now to FIG. 1, a conceptual flow diagram of an embodiment of a condensation system and apparatus of this invention, generally 100, is shown. A spent power system stream S100 having parameters as at a point 1, enters into a condenser C of the system 100 from a power system (not shown), where it is cooled in counter-flow by a heated coolant stream S102 having parameters as at a point 11 in a first heat exchange step 11-12 to form a spent coolant stream S104 having parameters as at a point 12. In the condenser C, the coolant stream S102 causes the spent power system stream S100 to condense to form a condensate 102 that accumulates in a bottom 104 of the condenser C and a non-condensable vapor 106 that accumulates in the remainder 108 of the condenser C. The condensate 102 is removed from a bottom outlet 110 of the condenser C as a condensate stream S106 having parameters as at a point 2. The condensate stream S106 having the parameters as at the point 2 is then forwarded to a liquid portion 120 a receiver R via a liquid inlet 121.

The non-condensable vapor 106 located in the remainder 108 of the condenser C starting immediately above a level 112 of the liquid condensate 102 in condenser C, which comprises mostly non-condensable vapor, is removed from the condenser C from a lower vapor outlet 114 of the condenser C above the liquid level 112, forming a vapor stream S108 having parameters as at a point 3. The vapor stream S108 having the parameters as at the point 3 is forwarded to a vapor portion 122 of the receiver R via a vapor inlet 123.

A liquid stream S110 having parameters as at a point 4 is then removed from a bottom outlet 124 of the receiver R and divided in a dividing valve DV into a first liquid substream S112 having parameters as at a point 5 and a second liquid substream or absorbent stream S114 having parameters as at a point 6. The liquid substream Si 12 having the parameters as at the point 5 is then returned to the power system as an out-going fully condensed multi-component working fluid stream.

The absorbent stream S114 having the parameters as at the point 6, which represents only a small portion of total liquid stream S110 having the parameters as at the point 4, is then sent into a sub-cooler SC. In the sub-cooler SC, the absorbent stream S114 having the parameters as at the point 6 is cooled in counter-flow by a coolant stream S116 having parameters as at a point 10 in a second heat exchange step 10-11, to form the heated coolant stream S102 having the parameters as at the point 11 and a sub-cooled liquid stream S118 having parameters as at a point 7, where a state of the stream S118 corresponds to a sub-cooled liquid. Thereafter, the sub-cooled liquid stream S118 having the parameters as at the point 7 is pumped by a recirculating pump RP, to a desired higher pressure to form a higher pressure, sub-cooled liquid stream S120 having parameters as at a point 8. The higher pressure, sub-cooled liquid stream S120 having the parameters as at the point 8 is then sent into a sprayer SP through a top 126 of the receiver R. The sprayer SP is located in the vapor portion 122 of receiver R, above a level 128 of liquid.

The higher pressure, sub-cooled liquid stream S120 having the parameters as at the point 8 is then sprayed via the sprayer SP into the vapor portion 122 of the receiver R. This spray of sub-cooled liquid having the parameters as at the point 8 is adapted to absorb the vapor in the vapor portion 122 of the receiver R, which comprises the non-condensable vapor from the condenser C, converting the vapor and sub-cooled liquid into saturated liquid which is then combines with the condensate in the liquid portion 120 of the receiver R.

The removal of vapor and liquid from a condenser as separate streams that are forwarded separately to a receiver and the mixing the vapor with a sub-cooled liquid in the receiver is designed to reduce or completely prevent or eliminate the accumulation of non-condensable vapor in the condenser. By reducing or eliminating the accumulation of non-condensable vapor in a condensation system designed to completely condense multi-component working fluids, such as a spent vapor multi-component fluid stream from a power system, the condensation systems will have improved operational stability and efficiency, especially in a final condenser or condensation stage of such condensation systems.

The embodiment of FIG. 1 illustrates the condensation system of this invention using with a water cooled condenser and a water cooler sub-cooler.

Because uncondensable or non-condensable vapor accumulates fairly slowly in a condenser, the system described above can be operated intermittently, being turned on and off as needed; when a pressure in the condenser begins to increase due to accumulation of uncondensable or non-condensable vapor, the recirculating pump is activated and absorbent stream S114 having the parameters as at the point 6 is sent into sent into the sub-cooler SC.

Figure 1A:
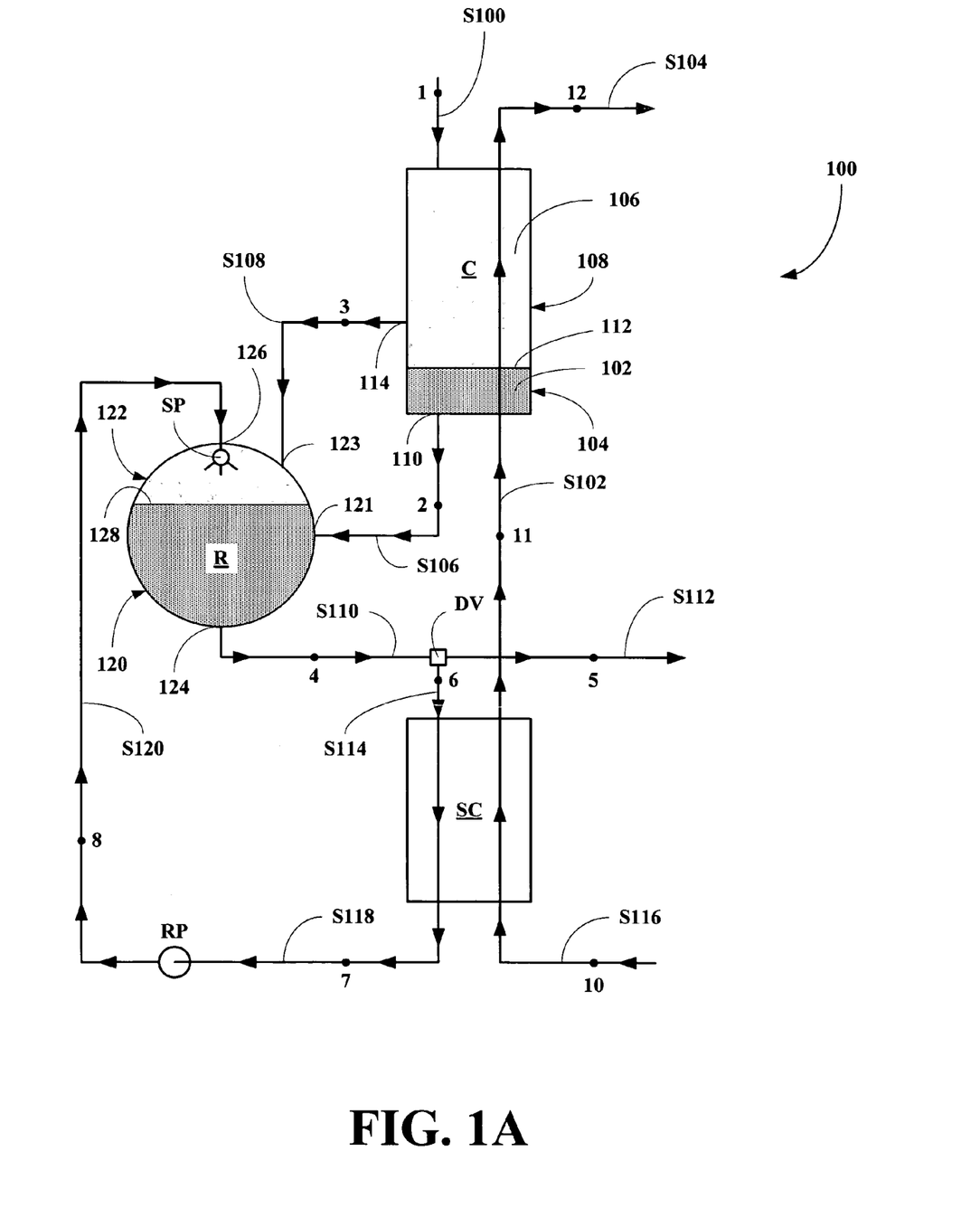
FIG. 1A shows a system with a single cooling stream.
Figure 1B:
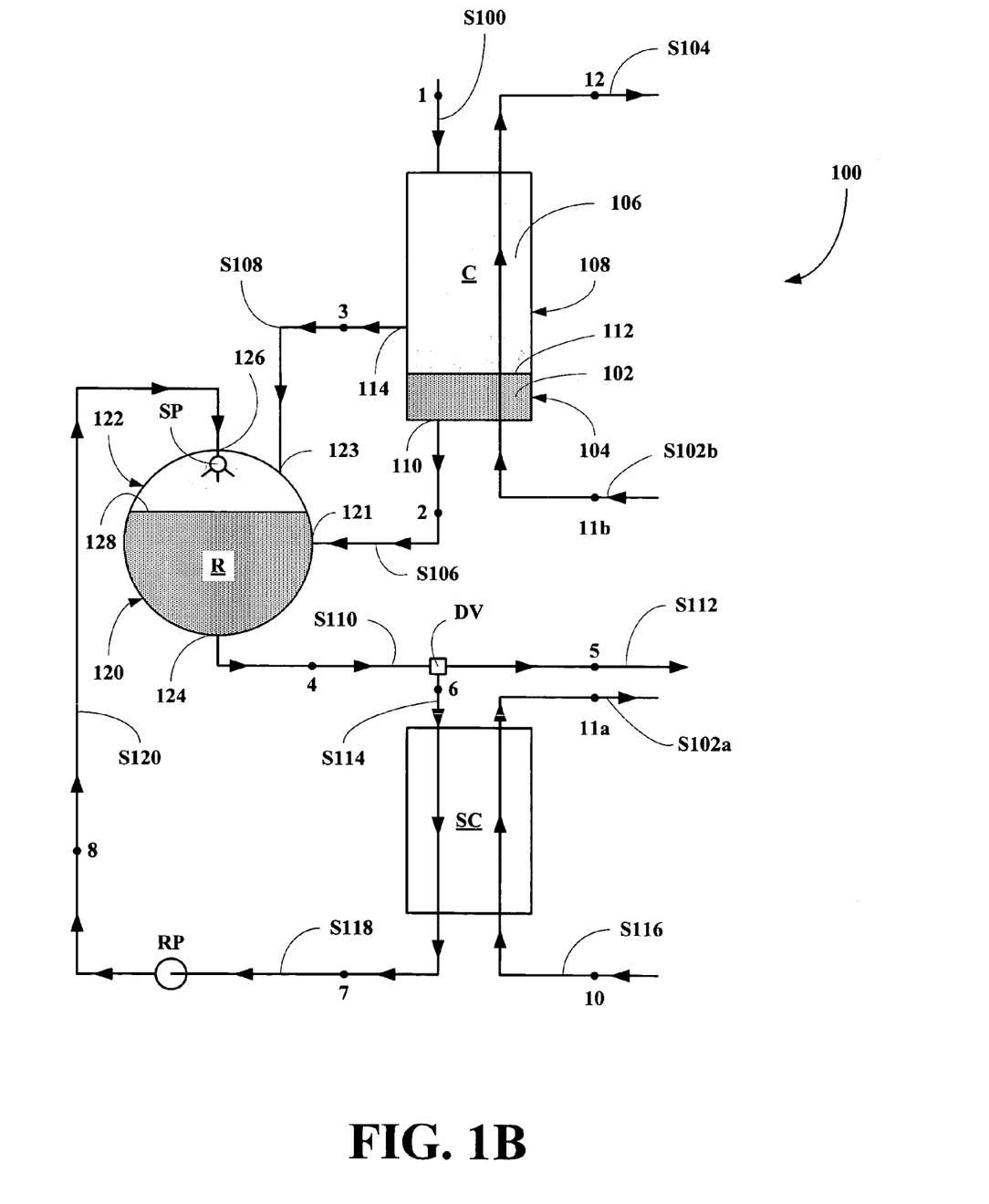
FIG. 1B shows a system with two coolant streams.

Referring now to FIG. 1B, a variant of the embodiment of FIG. 1A is shown, where the coolant streams are two different coolant streams instead of a single coolant stream flowing first through the sub-cooler SC and then through the condenser C. In the variant, the coolant stream exiting the sub-cooler SC is a first spent coolant stream S102a having parameters as at a point 11a, while the coolant stream entering the condenser C is a second coolant stream S102b having parameters as at a point 11b.

Figure 1C:
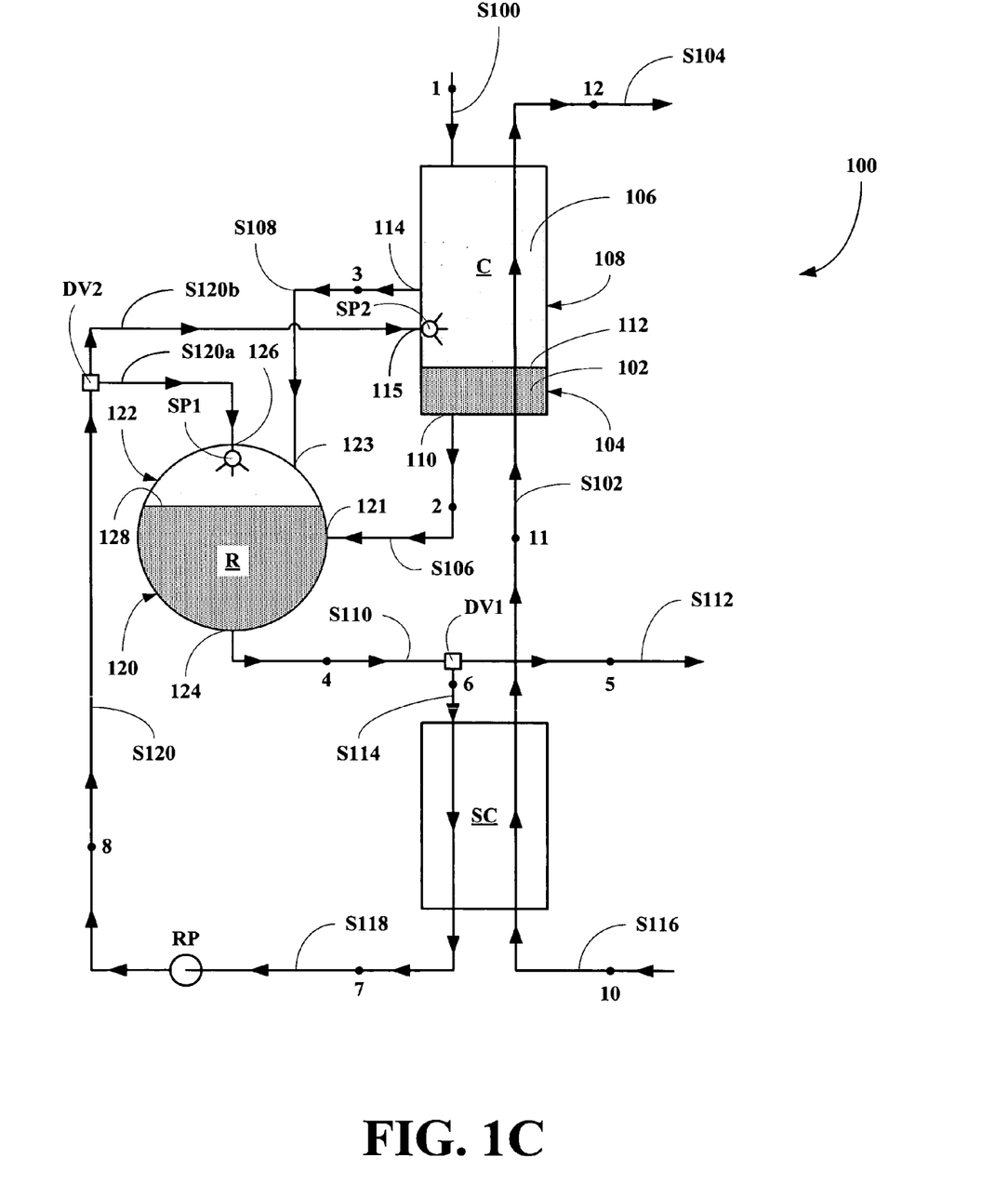
FIG. 1C shows a system that divides the sub-cooled absorbent stream.

Referring now to FIG. 1C, a second variant of the embodiment of FIG. 1A is shown, where the sub-cooled absorbent stream S120 having the parameters as at the point 8 is divided in a second dividing valve DV2 into a first sub-cooled absorbent stream S120a and a second sub-cooled absorbent stream S120b. The first sub-cooled absorbent stream S120a is then sprayed into the vapor section 122 of the receiver R through a first sprayer SP1. While the second sub-cooled absorbent stream S120b is sprayed into the vapor 106 in the condenser C through a second sprayer SP2 positioned at an additional liquid inlet 115.

SECOND EMBODIMENT

Figure 2A:
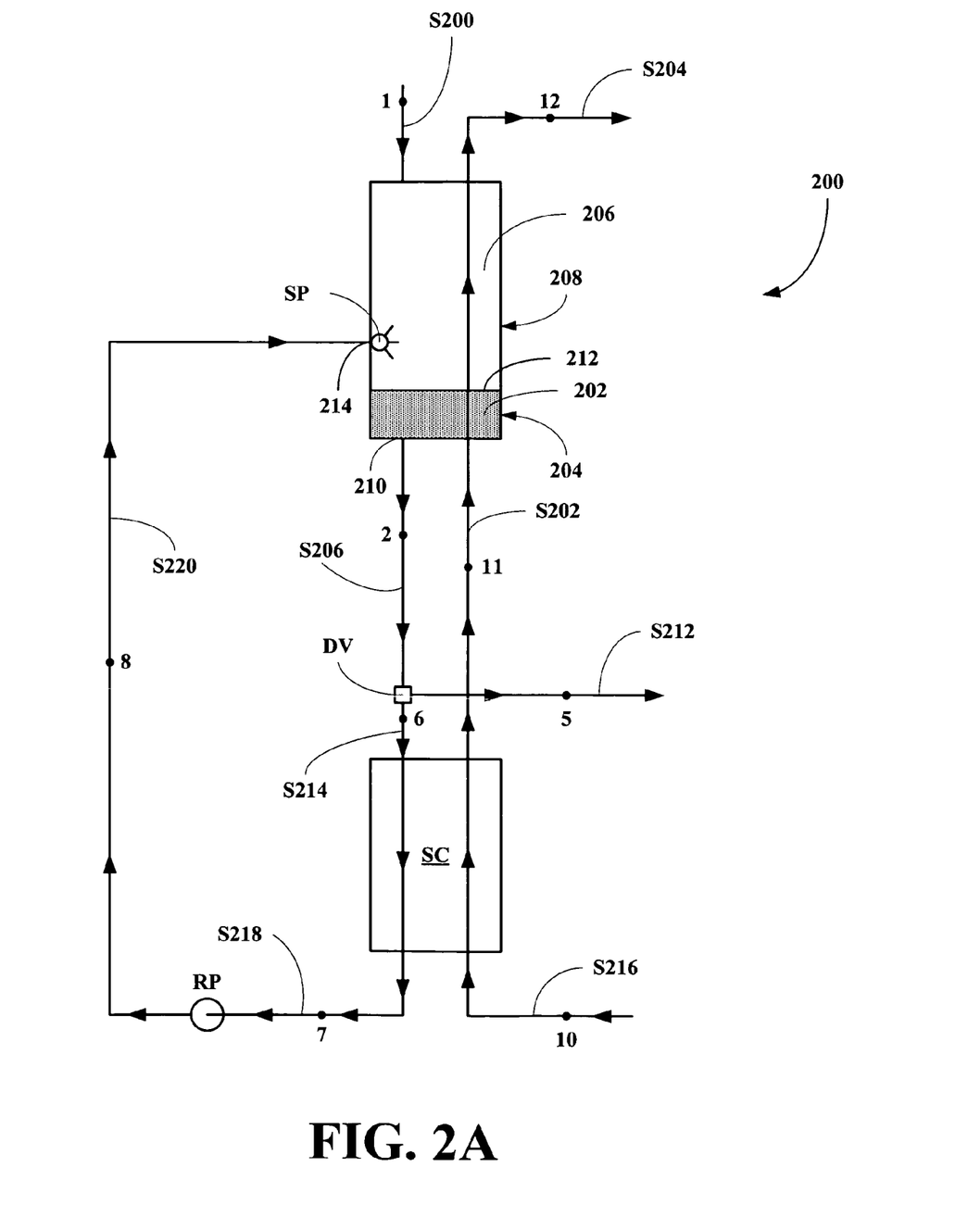
FIG. 2A shows a system with a single cooling stream.

Referring now to FIG. 2A, a second embodiment of a condensation apparatus and system of this invention, generally 200, is shown. A spent power system stream S200 having parameters as at a point 1, enters into a condenser C of the system 200 from a power system (not shown), where it is cooled in counter-flow by a heated coolant stream S202 having parameters as at a point 11 in a first heat exchange step 11-12 to form a spent coolant stream S204 having parameters as at a point 12. In the condenser C, the coolant stream S202 causes the spent power system stream S200 to partially condense to form a condensate 202 that accumulates in a bottom 204 of the condenser C and a vapor 206 that accumulates in the remainder 208 of the condenser C. The condensate 202 is removed from a bottom outlet 210 of the condenser C as a condensate stream S206 having parameters as at a point 2. The condensate stream S206 having the parameters as at the point 2 is then forwarded to a dividing valve DV, where it is split into a first liquid substream S212 having parameters as at a point 5 and a second liquid substream or absorbent stream S214 having parameters as at a point 6. The liquid substream S212 having the parameters as at the point 5 is then returned to the power system as an out-going fully condensed multi-component working fluid stream.

The absorbent stream S214 having the parameters as at the point 6, which represents only a small portion of total liquid stream S206 having the parameters as at the point 2, is then sent into a sub-cooler SC. In the sub-cooler SC, the absorbent stream S214 having the parameters as at the point 6 is cooled in counter-flow by a coolant stream S216 having parameters as at a point 10 in a second heat exchange step 10-11, to form the heated coolant stream S202 having the parameters as at the point 11 and a sub-cooled liquid stream S218 having parameters as at a point 7, where a state of the stream S218 corresponds to a sub-cooled liquid. Thereafter, the sub-cooled liquid stream S218 having the parameters as at the point 7 is pumped by a recirculating pump RP, to a desired higher pressure to form a higher pressure, sub-cooled liquid stream S220 having parameters as at a point 8. The higher pressure, sub-cooled liquid stream S220 having the parameters as at the point 8 is then sent into a sprayer SP through a lower liquid inlet 126 of the condenser C. The sprayer SP is located in the vapor portion 208 of the condenser C, above a liquid level 212 therein.

The higher pressure, sub-cooled liquid stream S220 having the parameters as at the point 8 is then sprayed via the sprayer SP into the vapor portion 208 of the condenser C. This spray of sub-cooled liquid having the parameters as at the point 8 is adapted to absorb the vapor in the vapor portion 208 of the condenser C, which comprises the non-condensable vapor formed in the condenser C, converting the vapor and sub-cooled liquid into saturated liquid which is then combines with the condensate 202 in the liquid portion 204 of the condenser C.

Figure 2B:
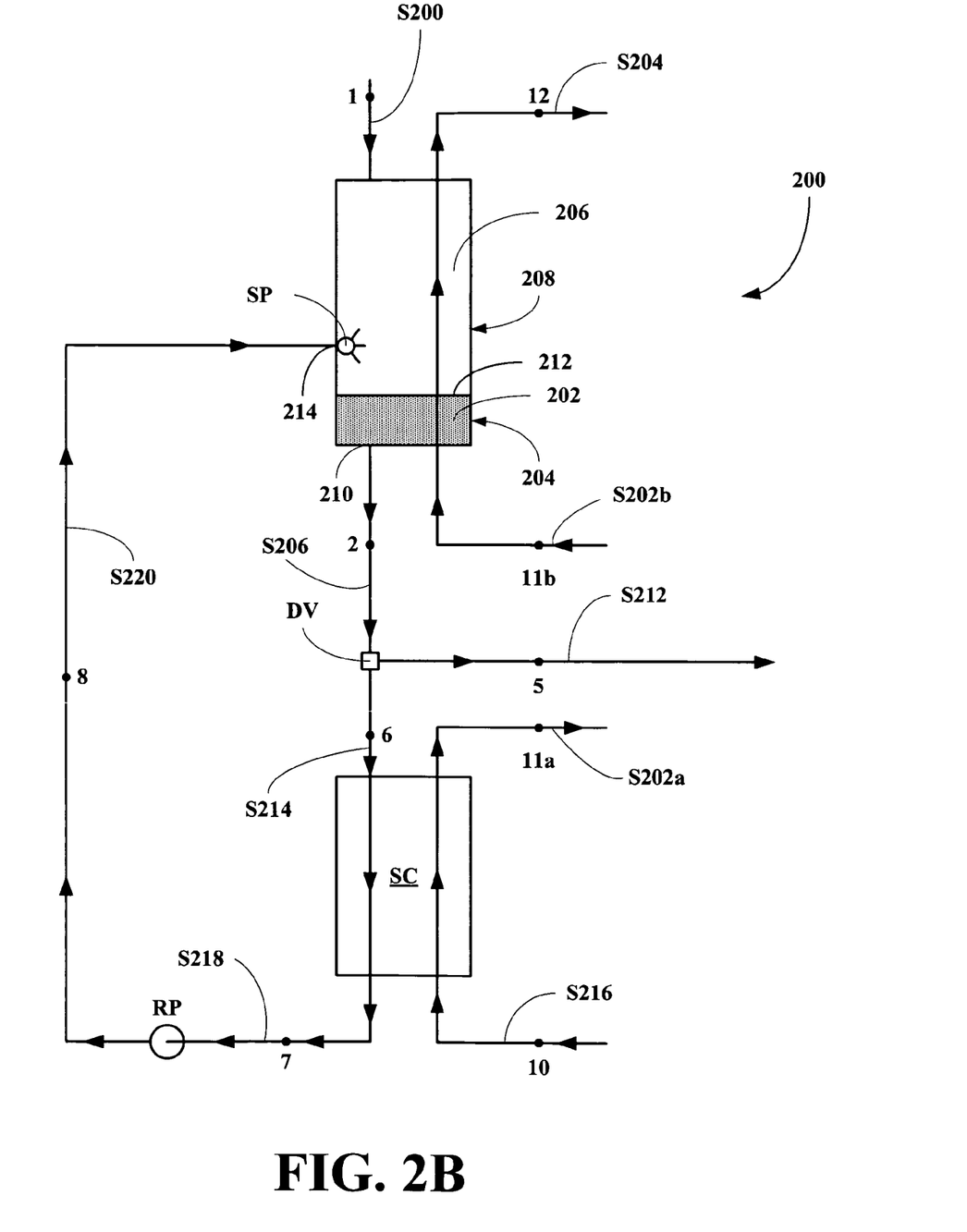
FIG. 2B shows a system with two coolant streams.

Referring now to FIG. 2B, a variant of the embodiment of FIG. 2A is shown, where the coolant streams are two different coolant streams instead of a single coolant stream flowing first through the sub-cooler SC and then through the condenser C. In the variant, the coolant stream exiting the sub-cooler SC is a first spent coolant stream S202a having parameters as at a point 11a, while the coolant stream entering the condenser C is a second coolant stream S202b having parameters as at a point 11b.

The apparatus and system 200 of FIGS. 2A&B are designed to operate with a water cooled, shell-and-tube vertical condenser apparatus and a separate receiver for absorbing the non-condensable vapor into a sub-cooled liquid is not needed. In this variant of the condensation system and apparatus, the sub-cooled liquid absorbent stream S220 having the parameters as at the point 8 is sprayed directly into the vapor portion 208 of the condenser C, immediately above the level 214 of the condensate 202.

THIRD EMBODIMENT

Referring now to FIG. 3, a third embodiment of a condensation apparatus and system, generally 300 is shown. A spent power system stream S300 having parameters as at a point 1, enters into an gas cooled condenser C of the system 300, where it is cooled in counter-flow with a heated gas coolant stream S302 in a first heat exchange process to form a spent gas stream S304 and a partially condensed stream S307 having parameters as at points 2 and 3. The stream S307 having the parameters as at the point 2 or 3 is then forwarded to a liquid portion 320 a receiver R via a liquid inlet 321.

A liquid stream S310 having parameters as at a point 4 is then removed from a bottom outlet 324 of the receiver R and divided in a dividing valve DV into a first liquid substream S312 having parameters as at a point 5 and a second liquid substream or absorbent stream S314 having parameters as at a point 6. The absorbent stream S312 having the parameters as at the point 5 is then returned to the power system as an out-going fully condensed multi-component working fluid stream.

The absorbent stream S314 having the parameters as at the point 6, which represents only a small portion of total liquid stream S310 having the parameters as at the point 4, is then sent into a sub-cooler SC. In the sub-cooler SC, the absorbent stream S314 having the parameters as at the point 6 is cooled in counter-flow by an initial gas coolant stream S316 generated by a fan F in a second heat exchange process, to form the heated coolant stream S302 and a sub-cooled liquid absorbent stream S318 having parameters as at a point 7, where a state of the absorbent stream S318 corresponds to a sub-cooled liquid. Thereafter, the sub-cooled liquid absorbent stream S318 having the parameters as at the point 7 is pumped by a recirculating pump RP, to a desired higher pressure to form a higher pressure, sub-cooled liquid absorbent stream S320 having parameters as at a point 8. The higher pressure, sub-cooled liquid absorbent stream S320 having the parameters as at the point 8 is then sent into a sprayer SP through a top 326 of the receiver R. The sprayer SP is located in the vapor portion 322 of receiver R, above a level 328 of liquid.

The higher pressure, sub-cooled liquid absorbent stream S320 having the parameters as at the point 8 is then sprayed via the sprayer SP into the vapor portion 322 of the receiver R. This spray of sub-cooled liquid having the parameters as at the point 8 is adapted to absorb the vapor in the vapor portion 322 of the receiver R, which comprises the non-condensable vapor from the condenser C, converting the vapor and sub-cooled liquid into saturated liquid which is then combined with the condensate in the liquid portion 320 of the receiver R.

Figure 3A:
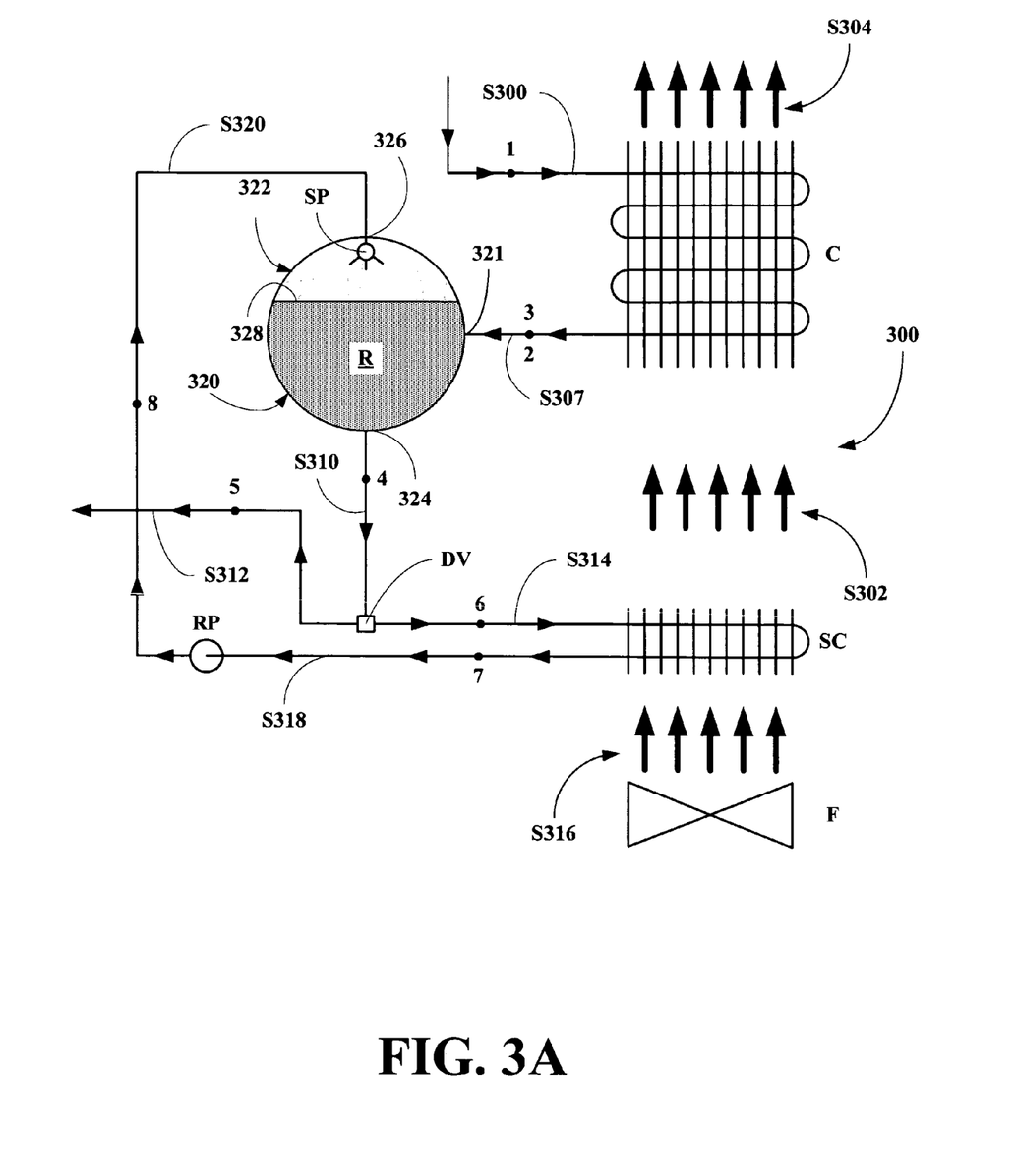
FIG. 3A shows a system with a single cooling stream.
Figure 3B:
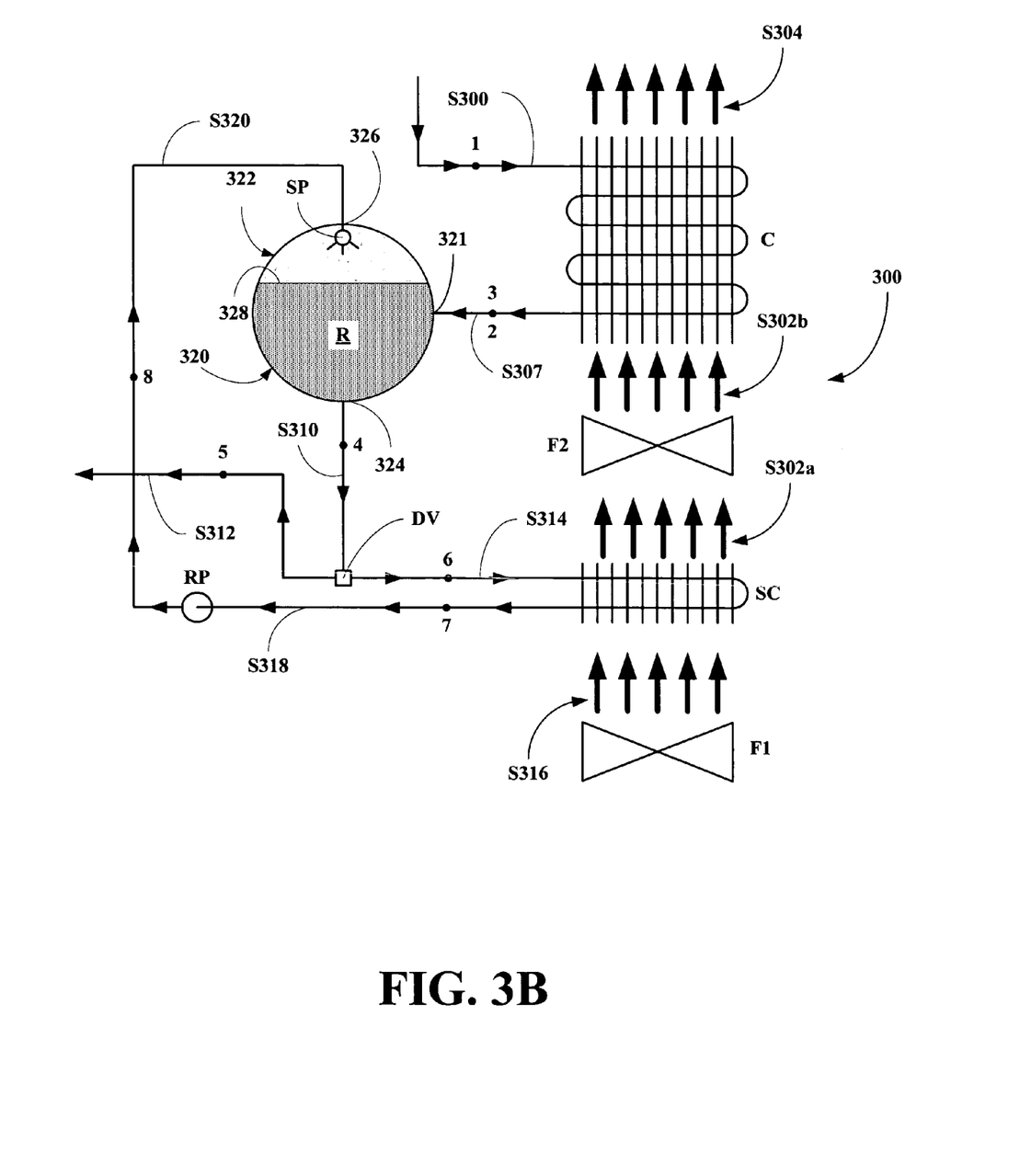
FIG. 3B shows a system with two coolant streams.

Referring now to FIG. 3B, a variant of the embodiment of FIG. 3A is shown, where the coolant gas streams are two different coolant gas streams instead of a single coolant gas stream flowing first through the sub-cooler SC and then through the condenser C propelled by a single fan F. In the variant, the coolant stream exiting the sub-cooler SC is a first spent coolant gas stream S302a, while the coolant stream entering the condenser C is a second coolant stream S302b. The first coolant gas stream S316 is forced through the sub-cooler SC via a first fan F1 and the second coolant gas stream S302b is forced through the condenser C via a second fan F2.

The embodiments of FIGS. 1A-C and FIGS. 2A&B illustrate the condensation systems of this invention using with a water or other liquid cooled condenser and a water or other liquid cooled sub-cooler. The embodiment of FIGS. 3A&B illustrate condensation systems of this invention using a force gas or air cooled radiator type condenser and radiator type sub-cooler.

Because uncondensable or non-condensable vapor accumulates fairly slowly in a condenser, the system described above can be operated intermittently, being turned on and off as needed; when a pressure in the condenser begins to increase due to accumulation of uncondensable or non-condensable vapor, the recirculating pump is activated and S314 stream having the parameters as at the point 6 is sent into sent into the sub-cooler SC.

In FIG. 3, an analogous system for air cooled condensers is shown. It's operation is identical to the system shown in FIG. 1.

Again because uncondensable vapor accumulates fairly slowly in a condenser, the system described above can be operated intermittently, being turned on and off as needed; when a pressure in the condenser begins to increase due to accumulation of uncondensable vapor, the recirculating pump is activated and S314 stream having the parameters as at the point 6 is sent into sent into the subcooler SC.

The removal of vapor and liquid from a condenser as separate streams that are forwarded separately to a receiver and the mixing the vapor with a sub-cooled liquid in the receiver is designed to reduce or completely prevent or eliminate the accumulation of non-condensable vapor in the condenser. By reducing or eliminating the accumulation of non-condensable vapor in a condensation system designed to completely condense multi-component working fluids, such as a spent vapor multi-component fluid stream from a power system, the condensation systems will have improved operational stability and efficiency, especially in a final condenser or condensation stage of such condensation systems.

In summary, the systems of this invention prevent the accumulation of non-condensable vapor in the final condenser and allow for the systems to operate with unimpeded efficiency.

All references cited herein are incorporated by reference. While this invention has been described fully and completely, it should be understood that, within the scope of the appended claims, the invention may be practiced otherwise than as specifically described. Although the invention has been disclosed with reference to its preferred embodiments, from reading this description those of skill in the art may appreciate changes and modification that may be made which do not depart from the scope and spirit of the invention as described above and claimed hereafter.

I claim:

1. A condensation apparatus for condensing a multi-component fluid comprising:
   a first heat exchange unit adapted to condense an in-coming multi-component fluid stream in counter-flow with a first coolant stream to form a condensate and a non-condensable vapor, where the multi-component fluid comprises a lower boiling point component and a higher boiling point component;
   a first dividing valve adapted to divide a condensate stream into an out-going fully condensed multi-component fluid stream comprising a major portion of the condensate stream and an absorbent stream comprising a minor portion of the condensate stream;
   a second heat exchange unit adapted to sub-cool the absorbent stream with a second coolant stream to form a sub-cooled absorbent stream; and
   a pump adapted to pump the sub-cooled absorbent stream into the non-condensable vapor through a first sprayer, where the sub-cooled absorbent stream is sufficient to absorb an amount of non-condensable vapor reducing accumulation of non-condensable vapor in the apparatus and improving condensation stability and efficiency and where the apparatus completely condenses the incoming multi-component fluid to produce the out-going multi-component fluid.

2. The apparatus of claim 1, wherein the first sprayer is positioned in the first heat exchanger above a liquid level therein and wherein the condensate stream is withdrawn from a bottom of the first heat exchange unit.

3. The apparatus of claim 1, further comprising:
   a receiver adapted to receive the entire condensate stream and a non-condensable vapor stream from the first heat exchange unit, where the receiver includes a vapor section and a liquid section,
   wherein the sub-cooled absorbent stream is pumped into the vapor section of the receiver through the first sprayer positioned in the vapor section of the receiver to absorb the amount of the non-condensable vapor in the vapor section of the receiver and
   wherein the first dividing valve divides a condensate stream withdrawn from the liquid section of the receiver.

4. The apparatus of claim 1, further comprising:
   a receiver adapted to receive the entire condensate stream and a non-condensable vapor stream from the first heat exchange unit, where the receiver includes a vapor section and a liquid section,
   downstream of the pump, a second dividing valve adapted to divide the sub-cooled absorbent stream into a first sub-cooled absorbent substream and a second sub-cooled absorbent substream and
   wherein the first sub-cooled absorbent substream is introduced into the vapor section of the receiver through a second sprayer positioned in the vapor section of the receiver to absorb a first amount of the non-condensable vapor in the vapor section of the receiver,
   wherein the second sub-cooled absorbent substream is introduced into the non-condensable vapor in the first heat exchanger unit through the first sprayer positioned in the first heat exchanger above a liquid level therein to absorb a second amount of the non-condensable vapor, and
   wherein the first dividing valve divides a condensate stream withdrawn from the liquid section of the receiver.

5. The apparatus of claim 1, wherein the coolant stream is a liquid and the first heat exchange unit is a condenser and the second heat exchange unit is a sub-cooler.

6. The apparatus of claim 1, wherein the coolant stream is a gas and the first and second heat exchange unit are radiators.

7. The apparatus of claim 3, wherein the coolant stream is a liquid and the first heat exchange unit is a condenser and the second heat exchange unit is a sub-cooler.

8. The apparatus of claim 4, wherein the coolant stream is a liquid and the first heat exchange unit is a condenser and the second heat exchange unit is a sub-cooler.

9. The apparatus of claim 1, wherein the multi-component fluid comprises a lower boiling point component and a higher boiling point component.

10. The apparatus of claim 9, wherein the multi-component fluid is selected from the group consisting of a mixture of water and ammonia, a mixture of at least two hydrocarbons, a mixture of at least two freons, and a mixture of at least one hydrocarbon and at least one freon.

11. An apparatus comprising:
   a first heat exchanger adapted to condense an in-coming multi-component fluid stream with a first counter-flowing coolant stream to form a condensate and a non-condensable vapor, where the multi-component fluid comprises a lower boiling point component and a higher boiling point component;
   a dividing valve adapted to receive a condensate stream withdrawn from the first heat exchanger and split the condensate stream into an out-going fully condensed multi-component fluid stream comprising a major portion of the condensate stream and an absorbent stream comprising a minor portion of the condensate stream;
   a second heat exchanger adapted to sub-cool the absorbent stream with a second counter-flowing coolant stream to form a sub-cooled absorbent stream, and
   a pump adapted to inject the sub-cooled absorbent stream in the first heat exchanger through a sprayer positioned above a liquid level in the first heat exchanger, where the sub-cooled absorbent stream is sufficient to absorb an amount of non-condensable vapor reducing accumulation of non-condensable vapor in the apparatus and improving condensation stability and efficiency and where the apparatus completely condenses the incoming multi-component fluid to produce the out-going multi-component fluid.

12. The apparatus of claim 11, wherein the coolant stream is a liquid and the first heat exchanger is a condenser and the second heat exchanger is a sub-cooler.

13. The apparatus of claim 11, wherein the coolant stream is a gas and the first and second heat exchangers are radiators.

14. The apparatus of claim 11, wherein the multi-component fluid comprises a lower boiling point component and a higher boiling point component.

15. The apparatus of claim 14, wherein the multi-component fluid is selected from the group consisting of a mixture of water and ammonia, a mixture of at least two hydrocarbons, a mixture of at least two freons, and a mixture of at least one hydrocarbon and at least one freon.

16. An apparatus comprising:
   a first heat exchanger adapted to condense an in-coming multi-component fluid stream with a first counter-flowing coolant stream to form a condensate and a non-condensable vapor,
   a receiver including a vapor section and a liquid section, where the receiver is adapted to receive a condensate stream withdrawn from the first heat exchanger and a non-condensable vapor stream withdrawn from the first heat exchanger above a liquid level therein, a dividing valve adapted to receive a receiver condensate stream withdrawn from the receiver and to split the condensate stream into an out-going fully condensed multi-component fluid stream comprising a major portion of the condensate stream and an absorbent stream comprising a minor portion of the condensate stream;

a second heat exchanger adapted to sub-cool the absorbent stream with a second counter-flowing coolant stream to form a sub-cooled absorbent stream, and a pump adapted to inject the sub-cooled absorbent stream in the vapor section of the receiver through a sprayer positioned above a liquid level in the first heat exchanger, where the sub-cooled absorbent stream is sufficient to absorb an amount of non-condensable vapor reducing accumulation of non-condensable vapor in the apparatus and improving condensation stability and efficiency.

17. The apparatus of claim 16, wherein the coolant stream is a liquid and the first heat exchange unit is a condenser and the second heat exchange unit is a sub-cooler.

18. The apparatus of claim 16, wherein the coolant stream is a liquid and the first heat exchange unit is a condenser and the second heat exchange unit is a sub-cooler.

19. The apparatus of claim 16, wherein the multi-component fluid comprises a lower boiling point component and a higher boiling point component.

20. The apparatus of claim 19, wherein the multi-component fluid is selected from the group consisting of a mixture of water and ammonia, a mixture of at least two hydrocarbons, a mixture of at least two freons, and a mixture of at least one hydrocarbon and at least one freon.

21. A method for condensing a multi-component fluid comprising the steps of:
condensing an in-coming multi-component fluid stream with a first coolant stream to form a condensate and a non-condensable vapor, where the multi-component fluid comprises a lower boiling point component and a higher boiling point component;
splitting a condensate stream into an out-going fully condensed multi-component fluid stream and an absorbent stream, where the out-going stream comprises a major portion of the condensate stream and the absorbent stream comprises a minor portion of the condensate stream;
sub-cooling the absorbent stream with a second coolant stream to form a sub-cooled absorbent stream; and
contacting the sub-cooled absorbent stream with the non-condensable vapor, where the sub-cooled absorbent stream is sufficient to absorb an amount of non-condensable vapor reducing its accumulation and improving condensation stability and efficiency and where the apparatus completely condenses the incoming multi-component fluid to produce the out-going multi-component fluid.

22. The method of claim 21, wherein the condensing occurs in a condenser, the condensate stream is withdrawn from the condenser, and the contacting occurs in the condenser above a liquid level therein.

23. The method of claim 21, further comprising the step of:
prior to splitting, transferring the condensate stream and a stream of non-condensable vapor into a receiver having a vapor section and a liquid section, and
wherein the contacting occurs in the vapor section of the receiver and the condensate stream is withdrawn from the liquid section of the receiver.

24. The method of claim 21, wherein the multi-component fluid comprises a lower boiling point component and a higher boiling point component.

25. The method of claim 24, wherein the multi-component fluid is selected from the group consisting of a mixture of water and ammonia, a mixture of at least two hydrocarbons, a mixture of at least two freons, and a mixture of at least one hydrocarbon and at least one freon.

26. A method for condensing a multi-component fluid comprising the steps of:
condensing an in-coming multi-component fluid stream with a first coolant stream in a first heat exchange unit to form a condensate and a non-condensable vapor,
forwarding a condensate and a vapor to a receiver including a vapor section and a liquid section,
splitting a condensate stream from the liquid section of the receiver in a dividing valve into an out-going fully condensed multi-component fluid stream and an absorbent stream, where the out-going stream comprises a major portion of the condensate stream and the absorbent stream comprises a minor portion of the condensate stream;
sub-cooling the absorbent stream with a second coolant stream in a second heat exchange unit to form a sub-cooled absorbent stream; and
contacting the sub-cooled absorbent stream with the non-condensable vapor in the vapor section of the receiver, where the sub-cooled absorbent stream is sufficient to absorb an amount of non-condensable vapor reducing its accumulation and improving condensation stability and efficiency.

27. The method of claim 26, wherein the multi-component fluid comprises a lower boiling point component and a higher boiling point component.

28. The method of claim 27, wherein the multi-component fluid is selected from the group consisting of a mixture of water and ammonia, a mixture of at least two hydrocarbons, a mixture of at least two freons, and a mixture of at least one hydrocarbon and at least one freon.

* * * * *